US009648551B2

(12) United States Patent
Chung (10) Patent No.: US 9,648,551 B2
(45) Date of Patent: May 9, 2017

(54) JUDGMENT SYSTEM AND METHOD BASED ON WIFI ENVIRONMENT FOR FACILITATING USAGE OF ELECTRONIC DEVICE (71) Applicant: Chiun Mai Communication Systems, Inc., New Taipei (TW)

(72) Inventor: Yu-An Chung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 178 days.

(21) Appl. No.: 14/584,575

(22) Filed: Dec. 29, 2014

(65) Prior Publication Data

US 2015/0257087 A1  Sep. 10, 2015

(30) Foreign Application Priority Data

Mar. 10, 2014  (CN) .......................... 2014 1 0085934

(51) Int. Cl.
*H04W 48/16* (2009.01)
*H04W 8/02* (2009.01)
*H04W 8/00* (2009.01)

(52) U.S. Cl.
CPC ........... *H04W 48/16* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 5,544,321 A * | 8/1996 | Theimer | ................. | G06F 21/35 380/258 |
| 7,810,154 B2 * | 10/2010 | Hum | ..................... | H04W 12/12 380/258 |
| 7,937,103 B1 * | 5/2011 | Sigg | ....................... | H04W 52/28 455/522 |
| 8,112,083 B1 * | 2/2012 | Sigg | ....................... | H04W 60/02 455/408 |
| 9,131,462 B1 * | 9/2015 | Verghese | ............ | H04W 64/006 |
| 2002/0164997 A1 * | 11/2002 | Parry | ...................... | H04L 29/06 455/456.1 |
| 2002/0184418 A1 * | 12/2002 | Blight | .................... | G01C 21/20 710/100 |
| 2010/0317371 A1 * | 12/2010 | Westerinen | ....... | H04M 1/72566 455/456.6 |
| 2012/0046077 A1 * | 2/2012 | Kim | .................. | H04M 1/72577 455/566 |
| 2014/0108650 A1 * | 4/2014 | Asnis | .................. | H04L 43/0805 709/224 |

* cited by examiner

*Primary Examiner* — Ayaz Sheikh
*Assistant Examiner* — Tarrell Hampton
(74) *Attorney, Agent, or Firm* — Steven Reiss (57) ABSTRACT An electronic device having a judging system to facilitate an operation of the electronic device. The judging system includes a searching module for searching MAC addresses of WiFi devices in a presently working environment. A storing module stores the MAC addresses in a data base. A comparing module judges whether the present working environment is a previously encountered environment by comparing the MAC addresses for the present working environment with MAC addresses for the previously encountered environment which have been stored in the data base. A processing module has the electronic device to perform a predetermined function if the present working environment is judged as the previously encountered environment.

15 Claims, 5 Drawing Sheets

| Present environment | WMG-1 | WMG-2 | WMG-3 |
|---|---|---|---|
| 11:22:33:44:55:66 | ER:GH:GR:TH:HS:DH | AA:BB:CC:DD:EE:FF | D4:A5:SF:4S:21:DF |
| AA:BB:CC:DD:EE:FF | FS:AD:FS:DF:SF:SD | 12:34:56:78:90:ab | 45:D4:AS:2D:A2:4D |
| 12:34:56:78:90:ab | GF:TH:DS:HD:HD:SG | DE:FP:WS:GP:KG:32 | F4:SD:5F:4S:D5:F4 |
| AB:CD:EF:GH:LI:CC | FS:DF:GE:RA:GR:GG | DA:SD:FA:CC:GR:GT | DA:5A:SD:45:A4:SD |

| Present environment | WMG-1 | WMG-2 | WMG-3 |
|---|---|---|---|
| 11:22:33:44:55:66 | ER:GH:GR:TH:HS:DH | AA:BB:CC:DD:EE:FF | D4:A5:SF:4S:21:DF |
| AA:BB:CC:DD:EE:FF | FS:AD:FS:DF:SF:SD | 12:34:56:78:90:ab | 45:D4:AS:2D:A2:4D |
| 12:34:56:78:90:ab | GF:TH:DS:HD:HD:SG | DE:FP:WS:GP:KG:32 | F4:SD:5F:4S:D5:F4 |
| AB:CD:EF:GH:LI:CC | FS:DF:GE:RA:GR:GG | DA:SD:FA:CC:GR:GT | DA:5A:SD:45:A4:SD |
| ********** | QQ, www.weibo.com, Wechat | www.jd.com www.taobao.com www.vancl.com | www.kuguo.com www.youku.com www.xinhuanet.com |

JUDGMENT SYSTEM AND METHOD BASED ON WIFI ENVIRONMENT FOR FACILITATING USAGE OF ELECTRONIC DEVICE

CROSS-REFERENCE TO RELATED APPLICATIONS

This application claims priority to Chinese Patent Application No. 201410085934.X filed on Mar. 10, 2014, the contents of which are incorporated by reference herein.

FIELD

The present disclosure relates to an operation of a handheld electronic device, and particularly to a handheld electronic device which can search WiFi devices in a working environment to facilitate a convenient operation of the handheld electronic device.

BACKGROUND

WiFi is a wireless connection technology which enables personal computers and handheld electronic devices (such as mobile phones and tablet computers) to communicate with each other and internet base stations in a wireless manner. Almost all present smart phones, tablet computers and notebooks have WiFi connection capabilities. WiFi has become the most popular protocol for wireless connection. In some big cities of developed countries, the WiFi coverage thereof can reach near 100 percent.

How to help a user to more conveniently use a WiFi-enabled device in a Wi-Fi environment becomes an issue.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

The present disclosure is described in relation to a judgment system and method of an electronic device having a WiFi connection capability in a WiFi working environment whereby an operation of the electronic device can be more conveniently performed to facilitate the usage of the electronic device by the user.

Figure 1:
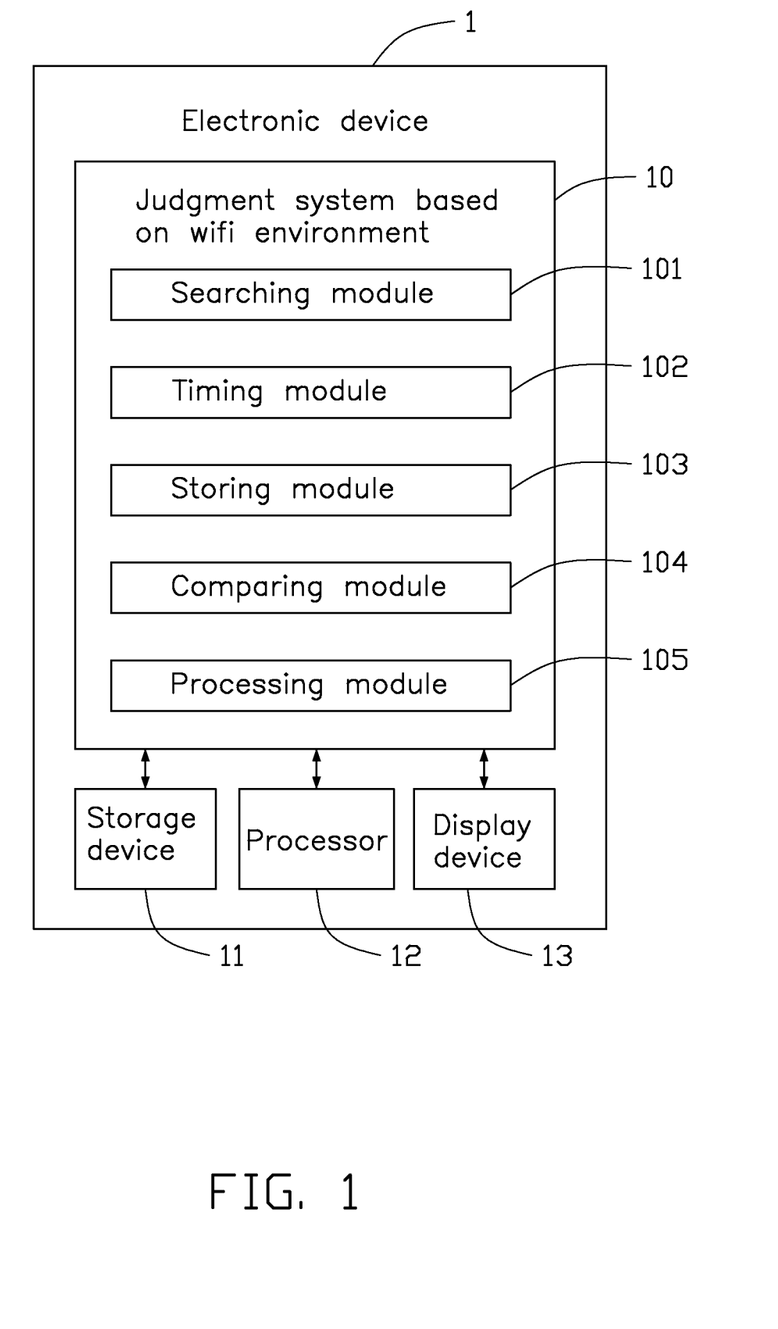
FIG. 1 is block diagram showing an electronic device having a judgment system in accordance with the present disclosure.

FIG. 1 illustrates a block diagram of an electronic device 1 having a judgment system 10 based on a WiFi working environment in accordance with the present disclosure. The electronic device 1 has a WiFi connection capability. The electronic device 1 can be, but not limited to, a notebook computer, a mobile phone, a smart phone, or a tablet computer. The electronic device 1 further has a storage device 11, a processor 12 and a display device 13. The storage device 11 is for storing searched WiFi device addresses and most used/visited application/website information therein. The storage device 11 can be memory integral in the electronic device 1, or an insertable memory card, such as a smart media card, a secure digital card or a flash card. The display device 13 is used for showing operations of the electronic device 1. The display device 13 can be a liquid crystal display (LCD) or preferably a touch panel.

The judgment system 10 of the electronic device 1 includes a plurality of modules which are stored in the storage device 11. The modules are executed by the processor 12 to complete the judgment method in accordance with the present disclosure. As shown in FIG. 1, the judgment system 10 based on a WiFi working environment is divided into a searching module 101, a timing module 102, a storing module 103, a comparing module 104 and a processing module 105. The functions of these modules 101, 102, 103, 104, 105 are detailed in connection with the flowchart of FIG. 2.

Figure 2:
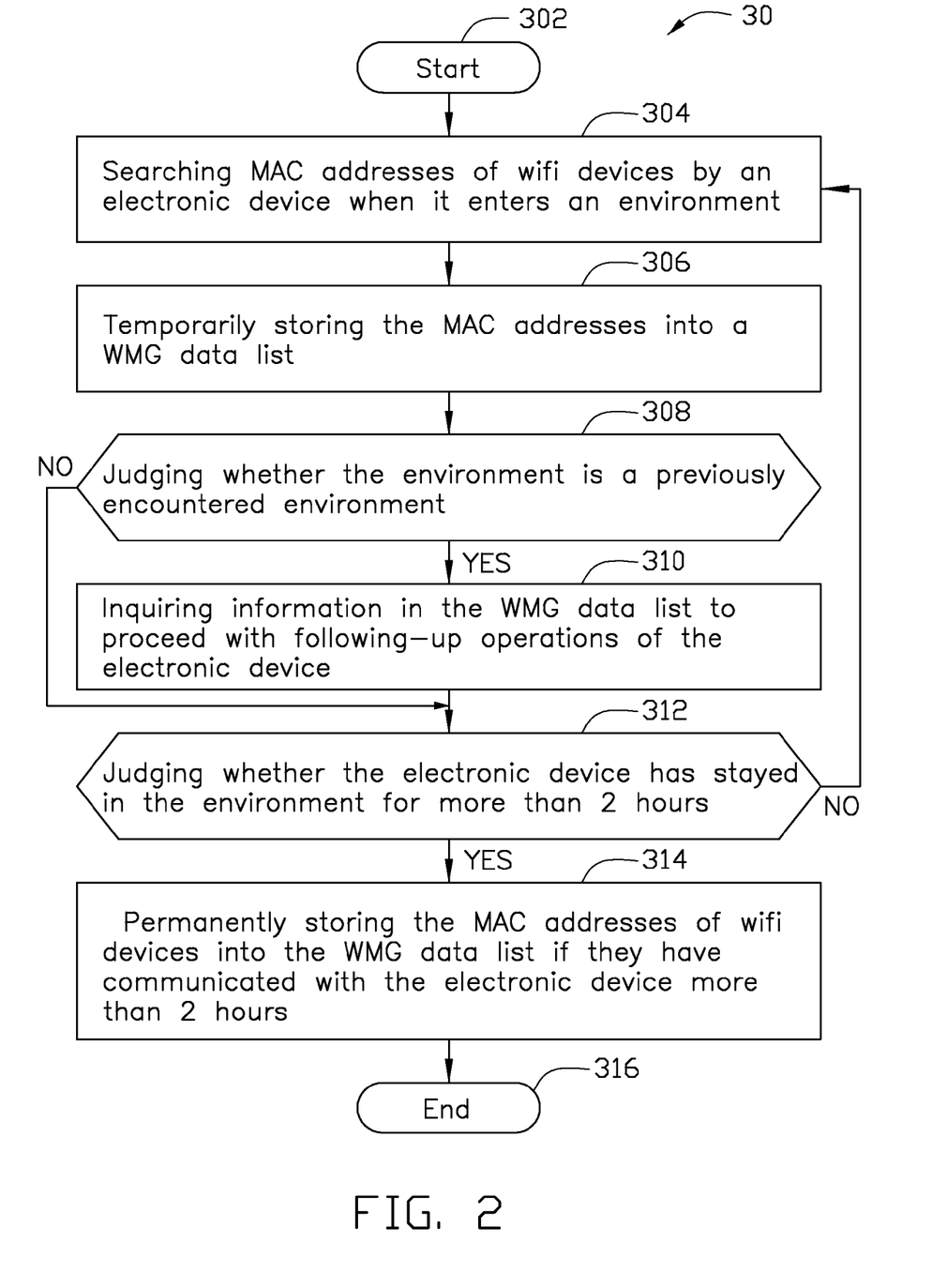
FIG. 2 is a flow chart showing a judgment method based on a WiFi environment in accordance with the present disclosure.

Referring to FIG. 2, a flowchart is presented in accordance with an example embodiment. The example judgment method 30 based on a WiFi working condition is provided by way of example, as there are a variety of ways to carry out the method. The method 30 described below can be carried out using the configurations illustrated in FIG. 1, and various elements of the figure are referenced in explaining the example method 30. Each block shown in FIG. 2 represents one or more processes, methods or subroutines, carried out in the example method 30. Furthermore, the illustrated order of blocks is illustrative only and the order of the blocks can change according to the present disclosure. Additional blocks can be added or fewer blocks may be utilized, without departing from this disclosure.

The method 30 starts from block 302. In block 304 when the electronic device 1 enters a working environment, the searching module 101 searches one or more Media Access Control Addresses (MAC addresses) of one or more WiFi devices in the working environment. The MAC address is a unique identifier assigned to network interfaces for communications on the physical network segment. The MAC address is used as a network address for most IEEE 802 network technologies, including Ethernet. Each WiFi device has a specific MAC address around the globe. Thus, when the searching module 101 searches the MAC addresses of WiFi devices in the working environment around the electronic device 1, the electronic device 1 can identify WiFi devices in the working environment.

The searching module 101 uses WiFi components (not shown) of the electronic device 1 to perform the searching activity for the MAC addresses of the WiFi devices in the working environment. The WiFi search, like a Bluetooth search, shows the results of the search in a list identifying the WiFi devices by their product names, for example, "Nokia-C503" or "Meizu-MX3", or "Samsung-Note 3". One MAC address corresponds to one product.

Figure 3:
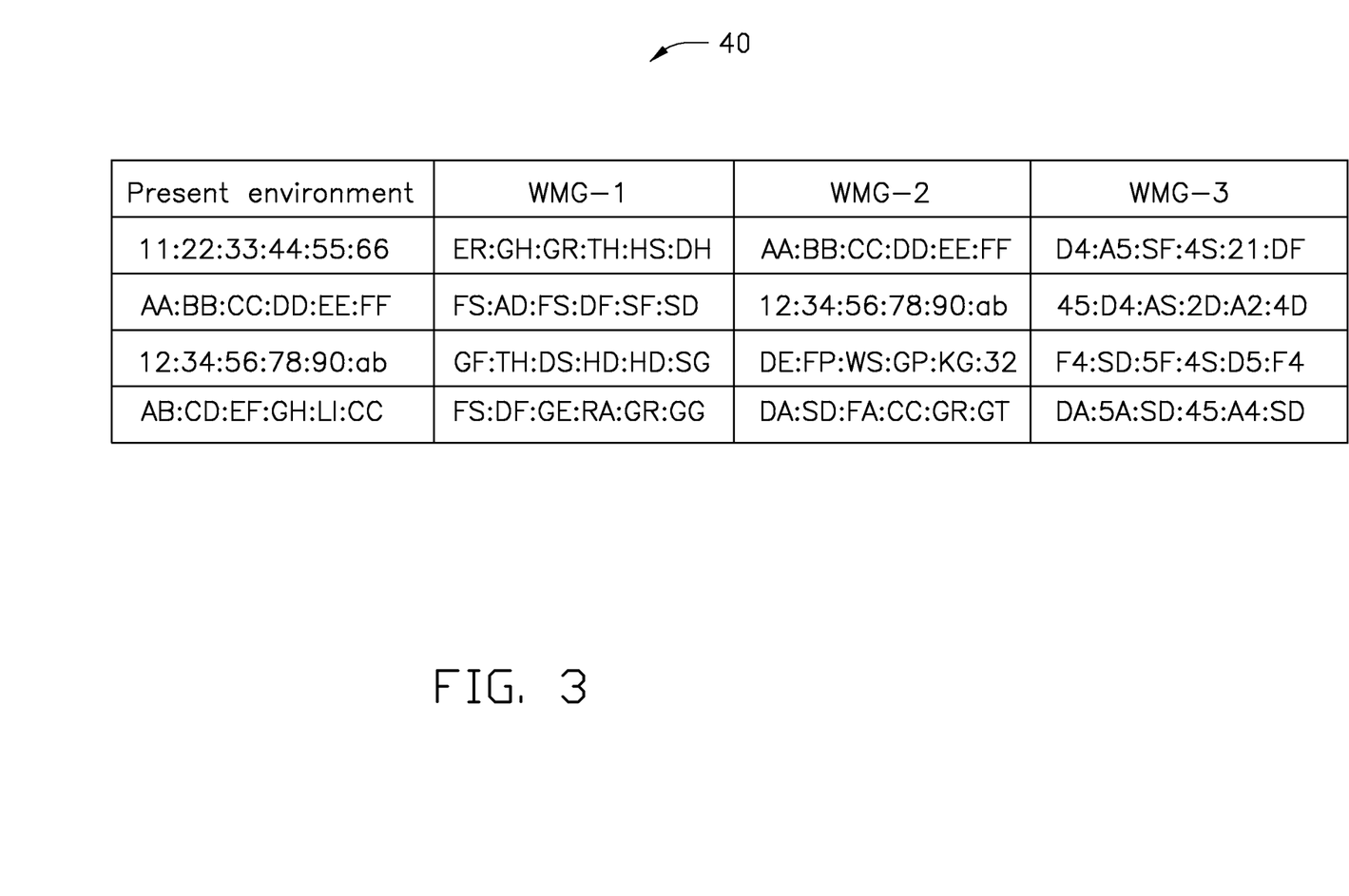
FIG. 3 is a WMG (Wi-Fi Mac Address Group) data list in accordance with the present disclosure.

In block 306, the storing module 103 temporarily stores the MAC addresses of the searched WiFi devices in the working environment in the cells of the column labeled as "Present environment" of a Wi-Fi MAC Address Group (WMG) data list 40 (referring to FIG. 3). Once the MAC addresses are stored in the cells, the timing module 102 starts to count the staying period of time of the electronic device 1 in the working environment.

The WMG data list 40 includes the columns labeled as "Present environment" and "WMG-X" (X being natural number of 1, 2, 3 . . . ) The column labeled as "Present environment" is related to a column for storing information temporarily, which in FIG. 2 is used for temporarily storing the MAC addresses of the WiFi devices in the working environment searched by the searching module 101 of the electronic device 1. The MAC addresses in the column of "Present environment" can be dynamically updated, corresponding to the searched result obtained by the searching module 101. On the other hand, the data in the columns labeled by "WMG-X" is permanently stored, which is related to MAC addresses of WiFi devices that are searched by the searching module 101 and communicate with the electronic device 1 for a predetermined long period of time in previous working environments encountered by the electronic device 1. Only when the electronic device 1 has stayed in the working environment longer than a predetermined period of time, the storing module 103 will translate the MAC addresses of the WiFi devices which are temporarily stored in the column of "Present environment" to the columns of "WMG-X" of the WMG data list 40, and then permanently store the MAC addresses therein.

In block 308, the comparing module 104 compares the MAC addresses of the WiFi devices in the column of "Present environment" with the MAC addresses stored in the columns of "WMG-X" of the WMG data list 40 to see whether the present working environment is a previously encountered environment. If the present working environment is a previously encountered environment, the method 30 moves to block 310; if not, the method 30 moves to block 312.

As shown in FIG. 3, the columns of "WMG-X" of the WMG data list 40 such as WMG-1, WMG-2 and WMG-3 permanently store the MAC addresses of WiFi devices which have been searched by the searching module 101 of the electronic device 1 in the previously encountered environments and communicated with the electronic device 1 longer than the predetermined period of time. Comparing the MAC addresses in the column of "Present environment" with the MAC addresses in the columns of "WMG-X", the electronic device 1 can judge the nature of the present working environment within which the electronic device 1 is located. For example, the MAC addresses of the notebook computer, the desktop computer and the mobile phone in an office environment can be permanently stored in one of the columns of "WMG-X" of the WMG data list 40, whereby the data in the column can be used to judge whether the present working environment is the office.

The manner how the comparing module 104 judges whether the present working environment is a previously encountered environment is disclosed as follows.

First, the comparing module 104 compares the MAC addresses of searched WiFi devices in the column of "Present environment" with the MAC addresses in the columns of "WMG-X" of the WMG data list 40 to see if there are any identical MAC addresses therebetween. If there is no identical MAC addresses, the comparing module 104 judges that the present working environment is not a previously encountered environment.

When there are identical MAC addresses in the columns of "WMG-X" and the column of "Present environment", the comparing module 104 will count the number of the identical MAC addresses. When the number is no less than a predetermined number, the comparing module 104 judges that the present working environment is a previously encountered environment. Preferably, the predetermined number is two. However the predetermined number can be altered by the user of the electronic device 1. The disclosure hereafter is based on the condition that the predetermined number is two. As shown in FIG. 3, since the MAC addresses in the column of "Present environment" have two MAC addresses the same as two of the MAC addresses in the column of WMG-2, the comparing module 104 judges that the present working environment is the same as the previously encountered environment of WMG-2.

When there are less than two MAC addresses in any of the columns of "WMG-X" identical to the MAC addresses in the column of "Present environment", the comparing module 104 judges that the present working environment is not a previously encountered environment.

In block 310, the processing module 105 inquires the MAC addresses in the column of WMG-2 which is related to the previously encountered environment that is the same as the present working environment, and proceeds with the scheduled operations of the electronic device 1. The scheduled operations include providing personally preferred service in the working environment of WMG-2. For example, when the working environment of WMG-2 is home, which once is identified by the electronic device 1, the electronic device 1 can automatically play music that the user is used to listening to when he or she is at home. Or the electronic device 1 can automatically turn on and execute software such as a game for the user to play.

During the above operations of the method 30 from blocks 304 to 310, the searching module 101 keeps searching the MAC addresses of the WiFi devices in the present working environment; the timing module 102 keeps counting the staying period of time of the electronic device 1 in the present working environment; and the storing module 103 keeps temporarily recording the MAC addresses of the searched WiFi devices in the column of "Present environment" of the WMG data list 40.

In block 312, the timing module 102 judges whether the electronic device 1 has stayed in the present working environment more than a predetermined period of time. Preferably, the predetermined period of time is two hours. However, it can be altered by the user of the electronic device 1. The disclosure hereafter is based on the condition that the predetermined period of time is two hours. When the staying period of time is more than two hours, the method 30 goes to block 314; otherwise the method 30 returns back to block 304.

When the staying period of time of the electronic device 1 in the present working environment counted by the timing module 102 is less than two hours, it means that the electronic device 1 has left the present working environment to a new working environment. Accordingly, the searching module 101 must perform a new search for the new working environment.

In block 314, when the staying period of time of the electronic device 1 in the present working device is longer than two hours, the storing module 103 will permanently store the MAC addresses of the WiFi devices which have been always in communication with electronic device 1 in a related one the columns of "WMG-X" of the WMG data list 40. These MAC addresses are translated to the related one of the columns of "WMG-X" from the column of "Present environment". In block 316, the method 30 ends.

For example, as shown in FIG. 3, there already have been three "WMG-X" columns, i.e., WMG-1, WMG-2, WMG-3 which are permanently stored with MAC addresses for three previously encountered environments, respectively. When the present working environment is judged by the comparing module 104 as one of the previously encountered environments, the storing module 103 will overwrite the MAC addresses of one (for example, WMG-2) of the columns of WMG-1 to WMG-3 with the MAC addresses temporarily stored in the column of "Present environment".

On the other hand, when the working environment is judged by the comparing module 104 as not the same as any of the previously encountered environments respectively represented by WMG-1, WMG-2 and WMG-3, the MAC addresses of the WiFi devices temporarily stored in the column of "Present environment" will be stored by the storing module 103 in a new "WMG-X" column, i.e., WMG-4 column (not shown).

Through blocks 304-314 of the present method 30, the electronic device 1 can search MAC addresses of WiFi devices in the working environment around the electronic device 1, judge the nature of the working environment, and automatically provide service according to the user's preference thereby to provide the user with more accurate and personalized service.

Figure 4:
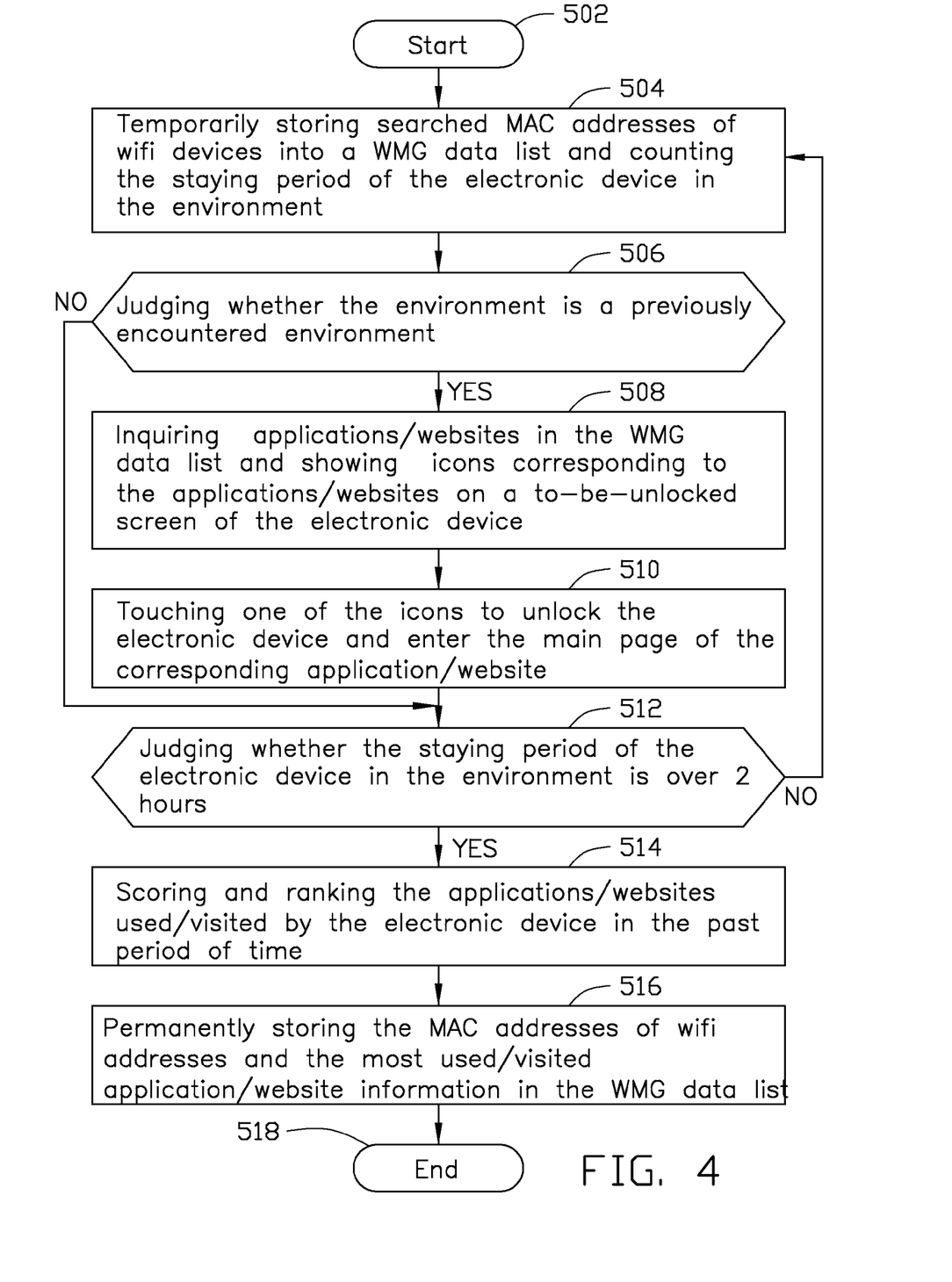
FIG. 4 is a flow chart showing a judgment method based on a WiFi environment in accordance with the present disclosure for use in practicing a first embodiment.

Referring to FIG. 4, a flowchart of a method 50 in accordance the present disclosure for a specific service is shown. The specific service is embodied by using the method 50 in accordance with the present disclosure to judge the nature of the working environment in which the electronic device 1 is located. The method 50 furthers scores and ranks applications/websites that the electronic device 1 executes/visits by their durations of use when the electronic device 1 is in the working environment, and records such scoring and ranking. When the electronic device 1 reenters the same working environment, the electronic device 1 can directly prompt icons of three most used applications and/or visited websites on the to-be-unlocked screen of the electronic device 1 according to the record. When the user chooses one of the three icons, the locked condition of the electronic device 1 can be immediately unlocked, and the electronic device 1 can directly enter the main page of the application/website corresponding to the chosen icon, whereby the user can directly use the application/website. Accordingly, a more convenient and personalized service can be provided to the user to enable the user to have a better experience in using the electronic device 1. Details of the method 50 are disclosed as follows.

In block 502, the method 50 is started. In block 504, when the electronic device 1, which in this embodiment is a mobile phone, particularly a smart phone with a touch panel, enters a working environment, the searching module 101 thereof searches MAC addresses of WiFi devices in the working environment. The storing module 103 temporarily stores the MAC addresses of the searched WiFi devices in the column of "Present environment" of a WMG data list 70 (referring to FIG. 5). The timing module 102 counts the period of time that electronic device 1 stays in the working environment. The processing module 105 counts number of times and durations that applications/websites that the electronic device 1 uses/visits during which the electronic device 1 is located in the working environment.

Figure 5:
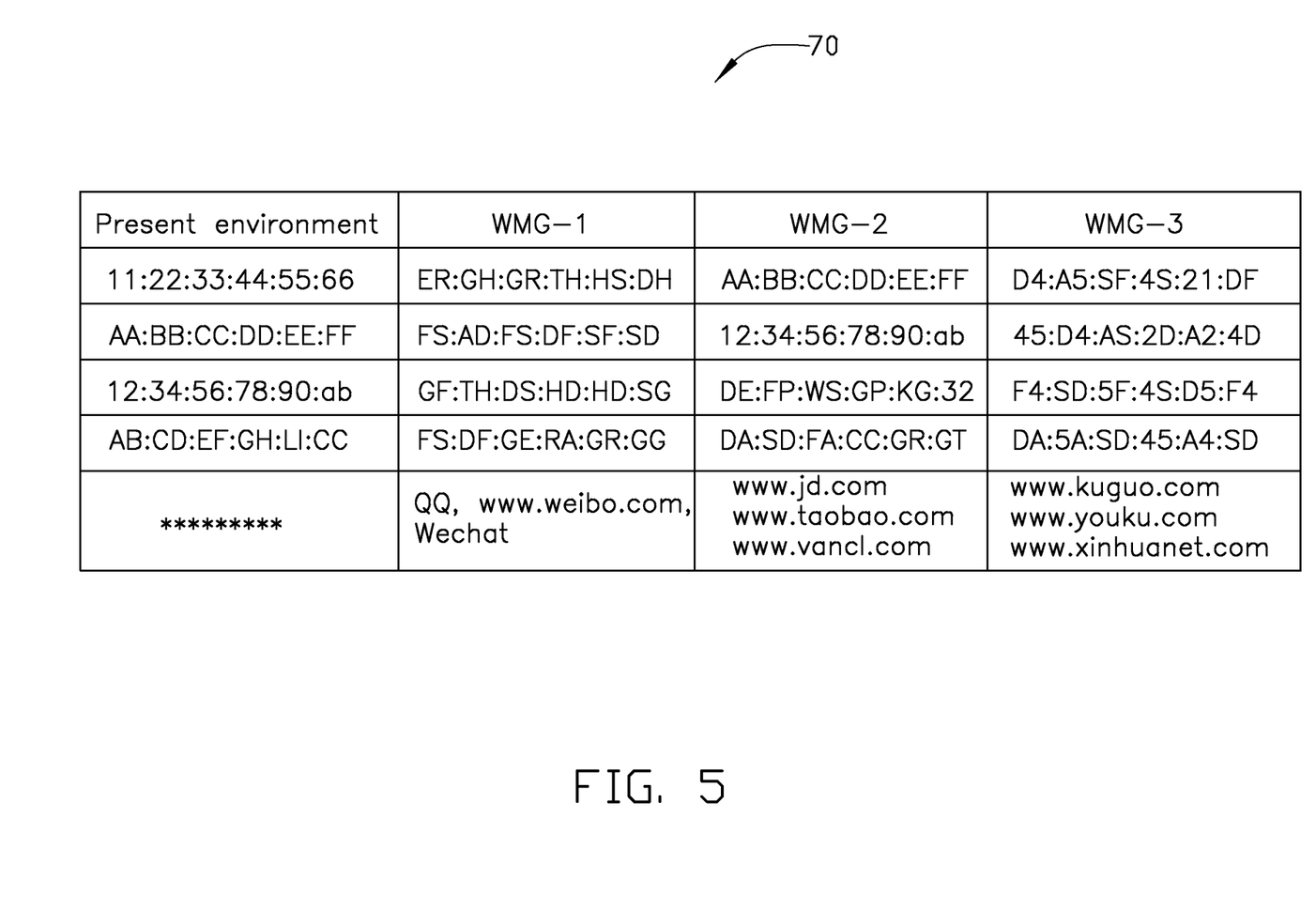
FIG. 5 is a WMG data list in accordance with the first embodiment of the method of the present disclosure.

In block 506, the comparing module 104 compares the MAC addresses temporarily stored in the column of "Present environment" with the MAC addresses recorded in the columns of "WMG-X" of the WMG data list 70 to judge whether the present working environment is a previously encountered environment. When the present working environment is judged as a previously encountered environment, the method 50 enters block 508; otherwise, the method 50 enters block 512.

In block 508, the processing module 105 inquires the information of the applications/websites stored in the column of "WMG-X" (WMG-2 in this embodiment) when the comparing module 104 judges that the present working environment is a previously encountered environment. Thereafter, the processing module 105 puts icons corresponding to the applications/websites in the to-be-unlocked screen of the electronic device 1.

When one of the icons shown in the to-be-unlocked screen of the electronic device 1 is activated by, for example, pressing the icon when the display device 13 of the electronic device 1 is a touch panel, the processing module 105 unlocks the electronic device 1 and enables the screen of the electronic device 1 to directly enter the main page of the application/website corresponding to the activated icon.

It can be understood from the aforesaid disclosure that during the operation of the method 50 from block 504 to block 510, the search module 101 always keeps searching the MAC addresses of the WiFi devices within the working environment; the timing module 102 always keeps counting the staying period of time of the electronic device 1 in the working environment; and the storing module 103 always keep storing the MAC addresses of the searched WiFi devices in the column of "Present environment" of the WMG data list 70.

In block 512, the timing module 102 counts the staying period of time of the electronic device 1 in the working environment and judges whether it has exceeded two hours.

If the staying period of time exceeds two hours the method 50 moves to block 514; otherwise, the method 50 returns back to block 504.

If the staying period of time of the electronic device 1 in the working environment does not exceed two hours, as counted by the timing module 102, which means that the electronic device 1 leaves the present working environment in less than two hours and enters a new working environment, the method 50 must be run again from block 504 for the new working environment.

In block 514, the processing module 105 scores and ranks the applications/websites that the electronic device 1 has executed/visited when the electronic device 1 is within the working environment. The processing module 105 then chooses three most used applications/websites as recommended applications/websites for the working environment.

The criterion for the most used/visited can be based on the durations of use/visit of the applications/websites. The three most used/visited applications/website can be the three applications/websites whose durations of use/visit are the first longest, second longest and third longest. Alternatively, the most used/visited can be based on the used/visited number of time. Still alternatively, the most used/visited can be based on a combined consideration of duration of use/visit and number of time of use/visit.

As shown in FIG. 5, in the working environment of WMG-1, the three most used/visited applications/websites of the electronic device 1 are QQ, www.weibo.com, Wechat, respectively. The three most used/visited applications/websites in the working environment of WMG-2 are www.jd.com, www.taobao.com, www.vancl.com, respectively. And the three most used/visited applications/websites in the working environment of WMG-3 are www.kuguo.com, www.youku.com, www.xinhuanet.com, respectively.

In block 516, the storing module 103 permanently stores the MAC addresses of the searched WiFi device which have always in communication with the electronic device 1 and the information of the three most used/visited applications/websites which are temporarily stored in the column of "Present environment" in one of columns of "WMG-X", which can be WMG-4 when the present working environment is not a previously encountered environment.

In more details, in block 516, when the present working environment is a previously encountered environment, the storing module 103 will overwrite the information of the three most used/visited applications/websites in the column of "WMG-X" (for example, WMG-2 in the shown embodiment of FIG. 5) with the information of the three most used/visited applications/websites in the column of "Present environment". Alternative, when the present working environment is not any of the previously encountered environments of WMG-1, WMG-2, WMG-3, the storing module 103 will permanently store the information of three most used/visited applications/websites in the column of "Present environment" in a column of WMG-4 of the WMG data list 70, which although not shown in FIG. 5 can be readily understood by person skilled in the art. In block 518, the method 50 ends.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. An electronic device comprising:
   a judgment system based on a WiFi environment, the judgement system comprising:
   a searching module for searching media access control (MAC) addresses of WiFi devices of a present working environment in which the electronic device is located;
   a storing module for storing MAC addresses of WiFi devices searched by the searching module in a database;
   a comparing module for determining whether the present working environment is one of previously encountered environments based on a comparison between the MAC addresses of WiFi device searched by the searching module and MAC addresses of the previously encountered environments stored in the database; and
   a processing module for enabling the electronic device to perform a predetermined function when the present working environment is determined to be one of the previously encountered environments; and
   a memory for storing the judgment system therein;
   a processor for executing the judgment system; and
   a display for displaying operations of the predetermined function;
   wherein the predetermined function includes presenting at least a computer icon in the display of the electronic device, the at least a computer icon is shown in a to-be-unlocked screen of the electronic device;
   wherein when the at least a computer icon is activated, the electronic device is unlocked and directly enters a main page of a software corresponding to the at least a computer icon.

2. The electronic device of claim 1, wherein the database is a WMG (Wi-Fi MAC address group) data list.

3. The electronic device of claim 2, wherein the WMG data list comprises a column for temporarily storing the MAC addresses of WiFi devices searched by the searching module in the present working environment, and at least a column for permanently storing the MAC addresses of WiFi device searched by the searching module in the previously encountered environment.

4. The electronic device of claim 3, wherein the previously encountered environment is established when the electronic device has stayed in the previously encountered environment longer than a predetermined period of time.

5. The electronic device of claim 4, wherein the predetermined period of time is two hours.

6. The electronic device of claim 3, wherein when a staying period of time of the electronic device in the present working environment is longer than a predetermined period of time and the present working environment is not judged as the previously encountered environment, the temporarily stored MAC addresses are translated into permanently stored MAC addresses in the database.

7. The electronic device of claim 6, wherein the predetermined period of time is two hours.

8. The electronic device of claim 1, wherein the at least a computer icon is activated by pressing a part of the display at which at least a computer icon is located.

9. A method for facilitating an operation of an electronic device, comprising:
   searching, by a searching module of the electronic device, MAC addresses of WiFi devices in a present working environment that the electronic device is located in;

storing in a database, by a storing module of the electronic device, the MAC addresses of the WiFi devices searched by the searching module in the present working environment;

comparing, by a comparing module of the electronic device, the MAC addresses of WiFi devices stored in the database with MAC addresses of previously encountered environments stored in the database to determine whether the present working environment is one of the previously encountered environments; and performing, by a processing module of the electronic device, a predetermined function when the present working environment is determined to be one of the previously encountered environments;

wherein the predetermined function comprises showing at least a computer icon in a display of electronic device, the computer icon is shown in a to-be-unlocked screen of the electronic device;

wherein by activating the at least a computer icon, the electronic device is unlocked and a software corresponding to the computer icon is executed.

10. The method of claim 9, wherein the display of the electronic device is a touch panel, and activation of the computer icon is achieved by pressing a part of the touch panel in which the computer icon is located.

11. The method of claim 9, wherein the software comprises one of an application and a website.

12. The method of claim 9, wherein the MAC addresses of WiFi devices searched by the searching module are temporarily stored in the database when the electronically is initially located in the present working environment and wherein when a staying period of time of the electronic device in the present working environment as counted by the timing module has reached a predetermined period of time, the temporarily stored MAC addresses are translated into permanently stored MAC addresses in the database.

13. The method of claim 12, wherein information of most used software during operation of the electronic device which has stayed in the present working environment for the predetermined period of time is permanently stored in the database with the permanently stored MAC addresses related to the present working environment.

14. The method of claim 13, wherein the predetermined period of time is two hours.

15. A non-transitory computer-readable storage medium having stored therein instructions which, when executed by a processor, cause the processor to perform operations comprising:

searching, by a searching module of an electronic device, MAC addresses of WiFi devices in a present working environment that the electronic device is located in;

storing in a database, by a storing module of the electronic device, the MAC addresses of the WiFi devices searched by the searching module in the present working environment;

comparing, by a comparing module of the electronic device, the MAC addresses of the WiFi devices stored in the database with MAC addresses of previously encountered environments to determine whether the present working environment is one of the previously encountered environments; and performing, by a processing module of the electronic device, a predetermined function when the present working environment is determined to be one of the previously encountered environments;

wherein the predetermined function comprises showing at least a computer icon in a display of electronic device, the computer icon is shown in a to-be-unlocked screen of the electronic device;

wherein by activating the at least a computer icon, the electronic device is unlocked and a software corresponding to the computer icon is executed.

* * * * *